United States Patent Office 2,981,726
Patented Apr. 25, 1961

---

2,981,726

PROCESS FOR POLYMERIZING PROPYLENE WITH A CATALYST OF ALUMINUM TRIALKYL, TITANIUM TETRACHLORIDE AND METALLIC IRON

Leon B. Gordon, Tulsa, Okla., assignor, by mesne assignments, to Standard Oil Company, Chicago, Ill., a corporation of Indiana No Drawing. Filed Apr. 2, 1958, Ser. No. 725,788

2 Claims. (Cl. 260—93.7)

The present invention relates to a novel catalyst composition and to the use thereof in the polymerization of olefins. More particularly it is concerned with the discovery that iron possesses the ability to promote the catalytic activity of known olefin polymerization catalysts and to activate materials which, in the absence of iron, do not function as such catalysts under otherwise identical conditions.

Briefly, my invention involves the discovery that free iron, when employed with a Ziegler type olefin polymerization catalyst composed of, for example, titanium tetrachloride and triisobutylaluminum, or with one component of said catalyst, for example, triisobutylaluminum; in the first instance renders the catalyst more active and in the second case imparts catalytic properties to the triisobutylaluminum. The Ziegler catalyst, with added iron, or the metal alkyl or equivalent portion of the Ziegler catalyst, when used in combination with free iron, constitutes an active catalyst for the preparation of high molecular weight polymers from olefins such as ethylene, propylene, 1-pentene, styrene, and the like.

Ziegler type catalysts for the polymerization of olefins, are well known, and hence their method of preparation need not be described in detail here. The iron portion of my catalyst system may be derived from a wide variety of sources such as naturally occurring ores of relatively high purity, for example, Allan Wood ore, magnetite, iron mill scale, which is a mixture of iron oxides, and the like. In converting these sources of iron into a suitable condition for use in my catalyst, the finely divided raw material is first subjected to reduction with substantially pure hydrogen, at temperatures ranging from about 95° to about 430° C., and pressures of from about 100 to about 600 p.s.i. The conditions used to provide iron of suitable quality, may be identical with those employed with the preparation of an iron hydrocarbon synthesis catalyst from iron oxide. The iron thus prepared may, or may not, be impregnated with an alkali metal carbonate such as potassium carbonate. For example, in preparing iron for use in my invention, starting with mill scale as the source, the material is first ground and screened, after which a selected portion from the grinding and screening steps may be impregnated with an aqueous solution of potassium carbonate, to give a concentration on the iron of from about 0.5 to about 2.0 weight percent as alkali metal oxide. The impregnated mass is then subjected to reduction with hydrogen at temperatures ranging preferably from about 315° to about 375° C. and at pressures of from 200 to 500 p.s.i. Completion of the reduction step is evidenced by the absence of water in the tail gas. Generally, however, it is desirable to continue treatment with hydrogen for two to ten hours, after water can no longer be detected. Care should be exercised to prevent contact of this reduced material with the air or moisture. Usually the reduced iron is maintained in an atmosphere of an inert gas, such as natural gas, carbon dioxide or nitrogen, until ready for use.

The component (hereafter sometimes referred to as the second component) which is activated by the use of reduced iron, in accordance with my invention, may be an organometallic compound, a hydrocarbon derivative of boron or an alkali metal hydride of boron or aluminum. The organometallic materials useful in preparing my catalyst, constitute a wide variety of compounds. The metals making up the organometallic compounds contemplated, are taken from groups IA to IIIA and IIB of the Periodic Chart of the Elements. Organometallic compounds derived from the following metals may be used in preparing the catalyst employed in my invention: Li, Na, K, Rb, Mg, Ca, Zn, Al, Ga, In, Tl, or mixtures of such derivatives. Typical of such compounds are $NaAl(C_3H_7)H_3$, $Zn(C_2H_5)_2$, $LiC_4H_9$, $C_2H_5MgI$, phenylmagnesium bromide, $C_4H_9ZnI$, $LiAl(C_2H_5)H_3$, organoaluminum compounds as the triarylaluminums, the trialkylaluminums, preferably the lower molecular weight derivatives such as triisobutylaluminum, triethylaluminum, triamylaluminum, and the like.

Hydrocarbon derivatives of boron, which may be used in practicing my invention, include the alkylborons and arylborons. Examples of such compounds are trimethylboron, triethylboron, tributylboron, tridecylboron, and the like. Typical of the arylborons that may be employed are triphenylboron, tritolylboron, trixylylboron, trinaphthylboron, and the like.

The aluminum and borohydrides making up the aforesaid second component, likewise constitute a large group of materials. As examples of these compounds, there may be mentioned $NaAlH_4$, $LiBH_4$, $NaBH_4$, $LiAlH_4$, together with complex metal hydrides such as $$NaAl(C_3H_7)H_3$$ 

mentioned above.

In addition to titanium tetrachloride, the halides of zirconium, hafnium, vanadium, niobium, tantalum, chromium, molybdenum, tungsten, etc. (groups of metals IVB, VB and VIB of the Periodic Chart of the Elements) may be used in combination with the above-mentioned second component, together with free iron, to form the catalyst of my invention. These metal halides, together with the aforesaid second component constitute what is now commonly referred to as the Ziegler type catalyst.

Based on my observations, the molar ratios of iron, second component and metal halide, do not appear to be critical and accordingly may be varied rather widely in preparing the catalyst of my invention. A suitable molar ratio of iron, second component and metal halide, has been found to be about 2 or 3 to 1 for the ratio of iron to said second component, and about 3 or 4 to 1 for the proportion of iron to the metal halide. The weight ratio of catalyst to olefin can, if desired, be varied from about 0.1 to about 10 weight percent.

While in most instances it is usually desirable to use the olefins, polymerized in accordance with my invention, in as pure form as possible, mixtures of such olefins can also be employed and other substances inert under the polymerization conditions can be present. For example, the crude product stream or the dehydrogenation of a normally gaseous paraffin hydrocarbon may be used directly in the process of my invention. Likewise refinery fractions of ethylene, propylene, butylene, or mixtures of such fractions may, if desired, be used. Such materials should generally be polymerized in the absence of contaminants which react with either the catalyst or with the reactants themselves.

My invention may be practiced over a wide range of temperatures and will be found to vary to some extent with the reactants and the activity of the particular catalyst used. Polymerization temperatures ordinarily, however, come within a range of about −30° to about 300°

C., such as from 30° to 250° C., preferably 60° to 150° C.

The pressures utilized likewise may vary rather widely. High molecular weight olefins may be polymerized in accordance with my invention, at atmospheric pressure. With normally gaseous olefins, superatmospheric pressure is generally desirable in order to provide an adequate concentration of olefin to contact the catalyst in the reaction medium. In general, polymerization of olefins, as practiced by my invention, may be conducted at pressures varying from atmospheric to 10,000 p.s.i.a. and above. In the majority of instances, however, pressures of the order of about 15 to about 1,500 p.s.i.a. are usually preferred.

While my invention may be effected by bringing into contact the catalyst and olefin under the above-stated reaction conditions, with the olefin in the gaseous, vapor or liquid phase, I ordinarily prefer to conduct my process in the liquid phase, with the aid of a solvent when necessary. This solvent should be a relatively inert material, such as saturated aliphatic hydrocarbons, for example, heptane, cyclic hydrocarbons, such as tetralin, cyclohexane, and the like, and ethers such as ethyl ether, butyl ether, tetrahydrafuran, 1,4-dioxane, dioxolane, and the like.

The products produced by the process of my invention can be worked-up in accordance with a variety of methods. If the polymer is a liquid, the reaction mixture, after the run has been discontinued, is washed with dilute acid and then with water. This serves to decompose the catalyst and to allow the product to separate from the solution of catalyst and water in the form of an upper organic layer. Solvent, if present, also is a part of the upper layer. The latter is then recovered and filtered, if suspended solids are present. The resulting clear, generally water-white solution of product in solvent is next subject to distillation, preferably under reduced pressure, and the polymerized product is recovered either as an overhead or as a kettle residue. Generally, kettle temperatures do not exceed 200° C. (@ 5 mm.). However, lower molecular weight, low boiling product, may also be produced.

When the product is normally a solid, the final reaction mixture is emptied into an acidified alcohol solution, preferably a methanol hydrochloric acid solution, whereupon the polymer is precipitated. After standing in this solution, usually from about one to about twenty-four hours, during which time occluded catalyst is dissolved out of the precipitate, the mixture is filtered or decanted. Thereafter, the product is washed with a suitable non-aqueous solvent, such as acetone or methanol, to remove any water that might be present. The product thus treated may, if desired, be further contacted in slurry form with acetone, methanol or a similar agent, in a high speed mixer, to remove the last traces of water. Thereafter, the slurry is filtered and the residue (product) further purified by extraction with a hot solvent having a boiling point of about 80° to about 250° C. Xylene is an example of a typical solvent which may be used to separate the polymer from ash-forming impurities and similar contaminants. In addition to xylene as a solvent in the purification step, there may also be mentioned benzene, toluene, various mineral oils, and the like. The solution of polymer is then poured into an anhydrous, low molecular weight alcohol, such as methanol, and the substantially pure solid product precipitated.

The degree of purification required will, of course, depend to some extent at least, on the intended use of the product. In cases where large quantities of polymer, i.e., in excess of about 100 grams per gram of catalyst are produced, it may not be necessary to remove the catalyst at all from the polymer.

The process of my invention may be further illustrated by the following specific examples:

*Example 1*

Into a one liter resin flask, which had been previously dried and assembled hot under a dry nitrogen atmosphere, was added, in the presence of nitrogen, 100 grams of finely divided reduced iron mill scale. To this was then added 300 ml. of n-heptane, which was dry and from which all unsaturated materials had been removed. A total of 9.5 grams of titanium tetrachloride in 20 ml. of n-heptane, was next added. Up to this point, nitrogen was continuously flowing through the flask. Thereafter, the flow of nitrogen was discontinued and propylene was next introduced at the rate of 20.4 grams per hour. When propylene flow was initiated, 15 grams of triisobutyl-aluminum was added as rapidly as possible. The reaction was exothermic, increasing from room temperature up to about 64° C., over a reaction period of six hours. At the end of this time the run was arbitrarily stopped. The contents of the flask were then cooled to about room temperature and the solution containing 35 ml. of methanol and 35 ml. of 12 N hydrochloric acid, was added thereto. All solids were recovered as distilled bottoms, by stripping off volatile liquids at atmospheric pressure and under vacuum. Since the bottoms material could be separated by filtration, this residue was added to a large volume of methanol, which served to coagulate the polymer. The iron and solid polymer were next separated by means of vacuum filtration. The solid thus obtained was then added to extraction thimbles and extracted with hot toluene in a Bailey-Walker extractor. Water present was separated as an azeotrope with soluene. The toluene extract was added to methanol, the polymer separated by filtration, dried at room temperature and finally vacuum dried to constant weight, at 70° C. The solid white polymeric material, thus recovered, amounted to 69 grams. Expressed in terms of catalyst used, the product was produced in a concentration of 2.8 grams per gram of catalyst (iron-free basis) present.

*Example 2*

In accordance with the procedure used in Example 1, propylene was polymerized using a catalyst consisting of 9.6 grams of titanium tetrachloride and 14.3 grams of triisobutylaluminum. The polymer recovered from this run was a yellow, rubbery solid, amounting to 20 grams or, in terms of catalyst employed, was produced in a concentration of 0.84 gram of polymer per gram of catalyst (iron-free basis).

A comparison of Examples 1 and 2, will readily show the activating and favorable influence of iron on the Ziegler polymerization catalyst.

*Example 3*

A mixture of 10 grams of reduced Venezuelan iron ore (originally containing 95 percent iron oxide), 10 grams of triisobutylaluminum and 100 ml. of n-heptane, was allowed to stand in a nitrogen atmosphere for three-quarters of an hour, at room temperature. The ore, prior to use, was reduced at 371° C. by contacting with substantially pure hydrogen at atmospheric pressure for a period of about forty-six hours. Thereafter, the resulting mixture was transferred to a 250 ml. Magne-Dash reactor under a nitrogen atmosphere. The bomb was sealed, 62 grams of propylene was added, and the mixture heated. During the reaction period of thirty-six hours, a maximum pressure of 650 p.s.i.g. was reached and a maximum temperature of 156° C. was observed. At the conclusion of the run, the solvent was distilled off and from the resulting residue, both solid and liquid polymers were recovered. A major portion of the liquid polymer was found to be 2-methyl-1-pentene. The balance was a high boiling oil.

Example 4

A total of one gram of freshly reduced iron, 10 ml. of heptane and 3.5 grams of triisobutylaluminum, was charged to a 100 ml. Magne-Dash reactor under a nitrogen atmosphere. The bomb was sealed and pressured to 500 p.s.i.g. with ethylene, heated to a maximum of 136° C. and periodically repressured during the run, which lasted for twenty-four hours. During this time the maximum pressure was 800 p.s.i.g. and the maximum temperature observed was 136° C. At the conclusion of the run, the contents of the bomb were emptied into a methanol-hydrochloric acid solution to precipitate a polymer product. This material was next extracted with hot xylene and a white polymer precipitated from the extract by addition of the latter to methyl alcohol.

Example 5

Into a 100 ml. Magne-Dash reactor containing a total of 10 ml. of heptane and 3.5 grams of triisobutyl-aluminum, was introduced sufficient ethylene, under a nitrogen atmosphere, to produce a pressure of 300 p.s.i.g. at room temperature. The bomb was then heated to a maximum of 138° C. and after a reaction period of six and one-half hours, the run was discontinued. On opening the bomb, no reaction product was observed.

The results shown in Examples 4 and 5 indicate the activating effect of iron on metal alkyls in polymerization of olefins. Thus, in Example 4, it is shown that both solid and liquid polymeric products were produced, whereas in Example 5, employing a catalyst containing no iron, no product, either solid or liquid, was obtained.

Example 6

Ten grams of Venezuelan iron ore (about 95 percent $Fe_2O_3$) was first reduced by passing hydrogen (0.5 cu. ft. per hour) through the finely divided ore for forty-five hours at about 370° C. at 300 p.s.i.g. The resulting reduced material was highly pyrophoric. This material was next added to 100 ml. of dry heptane and transferred to a 250 ml. Magne-Dash reactor under an atmosphere of nitrogen. To this mixture was next added 10 grams of triisobutylaluminum. The bomb was then sealed, heated to 150° C. and pressured with ethylene up to a pressure of 600 p.s.i.g. The run lasted for about twenty-two and one-half hours. During this time a maximum pressure of 700 p.s.i.g. was reached. After the run was discontinued, the solvent was removed from the reaction product and approximately 15 grams of a liquid oily material was recovered as a bottoms portion at a kettle temperature of 200° C. at atmospheric pressure.

The expression "olefinic hydrocarbon" as used herein, is intended to refer to both a single olefin and mixtures of these hydrocarbons.

The expression "high grade iron ore" as used herein, refers to ore in which the iron oxide content is at least about 95 percent.

I claim:
1. In a process for the polymerization of propylene, the improvement which comprises contacting said propylene under polymerization conditions with a catalyst consisting essentially of finely divided iron particles, trialkylaluminum, and titanium tetrachloride.
2. In a process for the polymerization of propylene, the improvement which comprises contacting said propylene under polymerization conditions with a catalyst consisting essentially of finely divided iron particles, triisobutyl aluminum, and titanium tetrachloride.

References Cited in the file of this patent

UNITED STATES PATENTS

| | | |
|---|---|---|
| 2,212,155 | Ellis | Aug. 20, 1940 |
| 2,822,357 | Brebner | Feb. 4, 1958 |

FOREIGN PATENTS

| | | |
|---|---|---|
| 874,215 | Germany | Apr. 20, 1953 |
| 773,536 | Great Britain | Apr. 24, 1957 |